United States Patent
Aoyama

(10) Patent No.: US 7,566,081 B2
(45) Date of Patent: Jul. 28, 2009

(54) CUSHIONING CLIP

(75) Inventor: Tetsuya Aoyama, Okazaki (JP)

(73) Assignee: Daiwa Kasei Kogyo Kabushiki Kaisha (JP)

( * ) Notice: Subject to any disclaimer, the term of this patent is extended or adjusted under 35 U.S.C. 154(b) by 0 days.

(21) Appl. No.: 11/803,856

(22) Filed: May 16, 2007

(65) Prior Publication Data
US 2007/0234527 A1 Oct. 11, 2007

Related U.S. Application Data
(63) Continuation of application No. PCT/JP2005/020361, filed on Nov. 7, 2005.

(30) Foreign Application Priority Data
Nov. 26, 2004 (JP) ............................. 2004-342551

(51) Int. Cl.
B60R 19/00 (2006.01)
(52) U.S. Cl. ..................... 296/1.03; 293/104
(58) Field of Classification Search ............... 296/1.03, 296/207; 293/104, 132, 136
See application file for complete search history.

(56) References Cited
U.S. PATENT DOCUMENTS 5,280,754 A * 1/1994 Flanagan et al. ............ 105/341
5,549,351 A * 8/1996 Park .......................... 296/207
5,626,384 A * 5/1997 Walther ...................... 296/155
5,791,723 A * 8/1998 Bell et al. ................... 296/155
6,039,389 A * 3/2000 Monette et al. ............. 296/207
RE36,825 E * 8/2000 Dailey ........................... 49/27
6,206,455 B1* 3/2001 Faubert et al. .............. 296/155
6,945,583 B1* 9/2005 Cowelchuk et al. ........ 296/39.1
7,073,835 B2* 7/2006 Jacobs ........................... 296/3

FOREIGN PATENT DOCUMENTS

| DE | 1 807 296 U | 3/1960 |
| DE | 199 33 617 A1 | 1/2001 |
| FR | 2 703 395 A | 3/1993 |
| JP | 7-145839 | 6/1995 |
| JP | 7-145840 | 6/1995 |
| JP | 2003-202043 | 7/2003 |

* cited by examiner

Primary Examiner—Hilary Gutman
(74) Attorney, Agent, or Firm—Lawrence G. Fridman

(57) ABSTRACT

A cushioning clip for receiving a movement of a movable member approaching a stationary member, including a cushioning part, for absorbing an impact force, and a mounting part for mounting the cushioning part to the stationary member. The cushioning part is formed of a flexible material exhibiting elasticity. The mounting part is formed of a rigid material exhibiting a predetermined rigidity. A hollow part is formed in the cushioning part. An inner wall of the hollow part is formed almost perpendicularly to the stationary member, and an apex part on a distal end side of the inner wall is flexed inwardly.

10 Claims, 11 Drawing Sheets

CUSHIONING CLIP

This is a continuation of International Patent Application PCT/JP05/020361, filed Nov. 7, 2005, which claims priority of Japanese Patent Application S.N. 2004-342551 filed Nov. 26, 2004.

FIELD OF THE INVENTION

The present invention relates to a cushioning clip for receiving the movement of a movable member for use in various opening and closing components of an automobile for example. The cushioning clip may be at a location close to an end of the movable member and able to absorb an impact force of the movable member.

BACKGROUND OF THE INVENTION

Conventionally known as a cushioning clip, this kind of clip is disclosed in JP 2003-202043 A for example. This cushioning clip is composed of a cushioning part, for receiving the movement of a movable member approaching a stationary member at a location close to an end of the movable member, and a mounting part, for mounting the cushioning part to a predetermined location of the stationary member. Since the cushioning part is elastically deformed in order to absorb an impact force caused upon receiving the movement of the movable member, the cushioning part is formed of a flexible material suited for this function (e.g., rubber, elastomer resin, or the like). Since the mounting part is constructed of a clip or the like for elastically engaging with the stationary member, the mounting part is formed of a rigid material suited for this function (e.g., polypropylene resin). Such a cushioning clip is designed for use in, for example, various opening and closing parts of an automobile (e.g., the lid of a glove compartment, a side door of a vehicle body, a hood, and the like).

SUMMARY OF THE INVENTION

In a conventional cushioning clip, the cushioning part may be permanently deformed when a long-term load or a load exceeding a certain limit is applied to the cushioning part from the movable member. In some cases, the cushioning part does not reassume its original shape even after the load has been removed. To prevent the cushioning part from being permanently deformed, it is also conceivable to form the cushioning part of a more rigid material. However, a sufficient impact absorbing effect cannot be obtained in receiving the movement of the movable member when the cushioning part is formed of a more rigid material.

It is thus an object of the present invention to provide a cushioning clip having a cushioning part formed of a flexible material that is unlikely to be permanently deformed, even when a long-term load or a load exceeding a certain limit is applied to the cushioning part.

In order to solve this problem, a cushioning clip for receiving the movement of a movable member approaching a stationary member is provided according to a first aspect of the present invention. The cushioning clip includes a cushioning part for absorbing an impact force and a mounting part for mounting the cushioning part to the stationary member. The cushioning part is formed of a flexible material exhibiting elasticity. The mounting part is formed of a rigid material exhibiting a predetermined rigidity. A hollow part is formed in the cushioning part. An inner wall of the hollow part is formed almost perpendicularly to the stationary member. An apex part on a distal end side of the inner wall is flexed inwardly. Thus, the cushioning part is unlikely to be deformed when receiving an impact or a load from the movable member because the hollow part is formed in the cushioning part, the inner wall of the hollow part is formed perpendicularly to the stationary member, and the apex part on the distal end side of the inner wall is flexed inwardly.

According to a second aspect of the present invention, in the cushioning clip of the first aspect, the hollow part has formed therein an opening part opening towards the distal end side. Formation of this opening part in the hollow part produces an effect of making the cushioning part unlikely to be deformed upon application of a load from the movable member. In addition, the opening part in the hollow part produces an effect of enhancing the capacity to absorb an impact from the movable member.

According to a third aspect of the present invention, in the cushioning clip of the first or second aspect, the hollow part is provided with a projection part projecting from a base end side toward the distal end side. The provision of this projection part in the hollow part produces an effect of making the cushioning part more unlikely to be deformed upon the application of a load from the movable member.

The present invention can provide a cushioning clip having a cushioning part formed of a flexible material that is unlikely to be permanently deformed even when a long-term load or a load exceeding a certain limit is applied thereto.

DETAILED DESCRIPTION OF THE INVENTION

Hereinafter, a first embodiment mode of the present invention will be described in detail.

Figure 1:
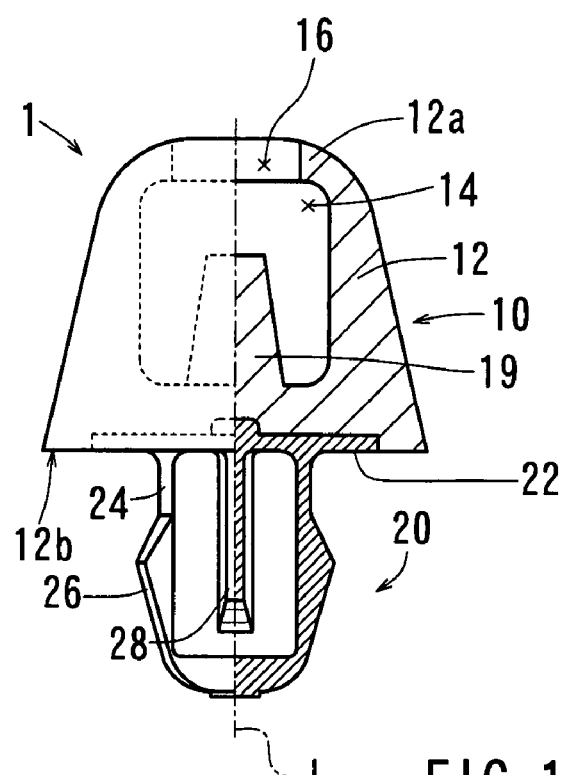
FIG. 1 is a front view illustrating a cushioning clip according to a first embodiment mode of the present invention.
Figure 2:
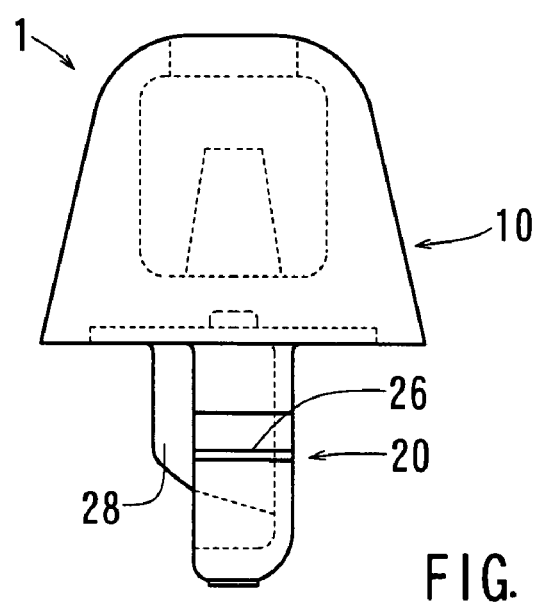
FIG. 2 is a side view illustrating the cushioning clip.
Figure 3:
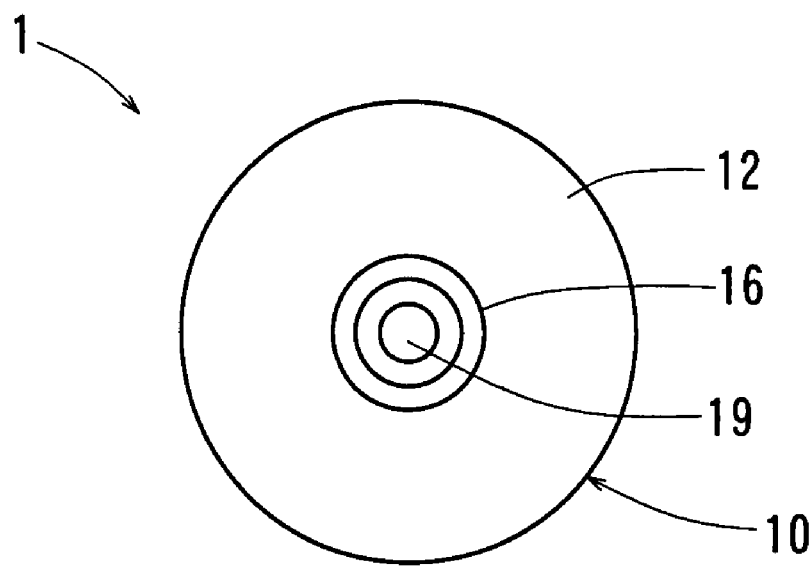
FIG. 3 is a top view illustrating the cushioning clip.
Figure 4:
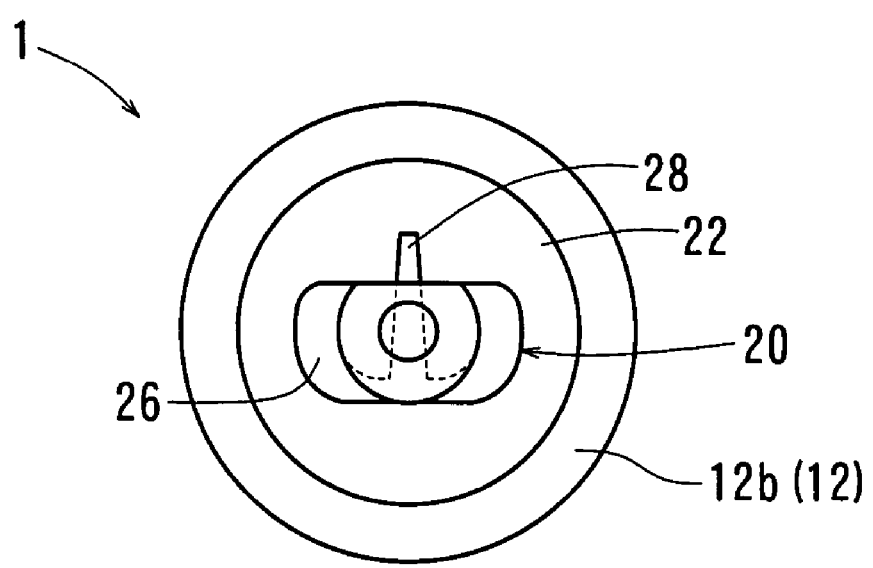
FIG. 4 is a bottom view illustrating the cushioning clip.
Figure 5:
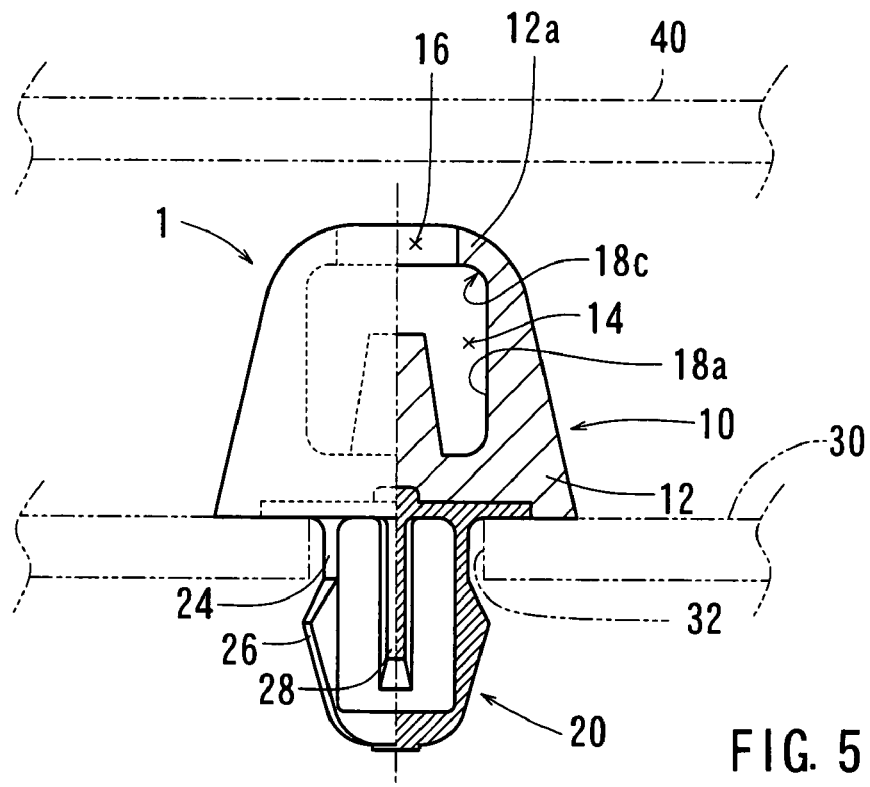
FIG. 5 is a front view showing a state in which the cushioning clip is mounted to a stationary member.

FIG. 1 is a front view illustrating a cushioning clip of the first embodiment mode, although it is shown in a sectional view on the right side of axis L. FIG. 2 is a side view illustrating the cushioning clip. FIG. 3 is a top view illustrating the cushioning clip. FIG. 4 is a bottom view illustrating the cushioning clip. FIG. 5 is a front view showing a state in which the cushioning clip is mounted to a stationary member. The cushioning clip 1, according to the first embodiment mode, is intended to absorb an impact force resulting from the opening or closing of a lid of a glove compartment located in front of a front passenger seat of an automobile. This cushioning clip 1 is broadly divided into a cushioning part 10 formed of a flexible material such as an elastomer resin, and a mounting part 20 formed of a rigid material such as polypropylene (PP). In this specification, a distal end side and a base end side of the cushioning clip 1 are respectively defined as a side on which the cushioning part 10 is disposed and a side on which the mounting part 20 is disposed, when the cushioning clip 1 is viewed as a whole. Further, an inner side and an outer side of the cushioning clip 1 are respectively defined as a center side (i.e., a side containing the axis L) and an opposite side thereof, also when the cushioning clip 1 is viewed as a whole.

The cushioning part 10 substantially assumes the shape of a truncated cone as a whole and receives an impact force at an apex part 12a on a small-diameter side of a main body 12 thereof. A base part 12b on a large-diameter side, located on the side opposite of the apex part 12a, covers a top face side of a base plate part 22 of the mounting part 20 (see FIG. 1) such that the cushioning part 10 is integrated with the mounting part 20. A hollow part 14 is provided substantially in the vicinity of the center of the main body 12 of the cushioning part 10. The hollow part 14 is a generally cylindrical hollow part that is formed such that the center thereof coincides with the axis L connecting the center of the cushioning part 10 to the center of the mounting part 20. The hollow part 14 is provided with a substantially circular opening part 16, opening toward the distal end side of the cushioning clip 1.

The mounting part 20 is equipped with a leg part 24 extending downward from the base plate part 22. The leg part 24 is inserted into a mounting hole 32 of a stationary member 30, as indicated by virtual lines in FIG. 5. The leg part 24 assumes the shape of a ship bottom (i.e., a boat keel) as a whole. Flexible wall parts on two sides of the leg part 24 respectively form engaging claws 26. A reinforcing rib 28 is formed on a central part of the leg part 24. By inserting the leg part 24 into the mounting hole 32 from one side of the stationary member 30, both of the engaging claws 26 pass through the mounting hole 32 in a state where the engaging claws 26 are inwardly deflected and then reach the other side of the stationary member 30 (see FIG. 5). Thus, the mounting part 20 elastically engages with the mounting hole 32 formed in the stationary member 30. As a result, the cushioning part 10 is mounted to the stationary member 30.

In this embodiment mode, the stationary member 30 corresponds to the main body of the glove compartment in a cabin of an automobile. In this embodiment mode, the movable member 40 corresponds to the lid of the glove compartment in the cabin of the automobile. In other words, the stationary member 30 and the movable member 40 are disposed facing each other. The movable member 40 respectively moves away from and toward the stationary member 30 when the lid of the glove compartment is opened and closed. By mounting the cushioning clip 1 to the stationary member 30, it becomes possible to receive the movement of the movable member 40, which is approaching the stationary member 30, at a location close to an end of the cushioning clip 1. Since the cushioning part 10 is formed of a flexible material such as an elastomer, it can absorb an impact force caused upon receiving the movable member 40.

As shown in FIG. 5, the main body 12 of the cushioning part 10 is provided with a hollow part 14. This hollow part 14 has an inner wall 18a that is perpendicular or almost perpendicular to the stationary member 30. The expression "almost perpendicular" implies that the inner wall 18a is substantially perpendicular to the stationary member 30. In other words, for example, the inner wall 18a forms an angle on the order of 90°±3° with the stationary member 30. The apex part 12a on the distal end side of the inner wall 18a of the hollow part 14 is flexed inward, thus forming a flexure part 18c. Since the inner wall 18a of the hollow part 14 is formed into such a shape, characteristic operations and effects are achieved as will be described below.

Figure 6:
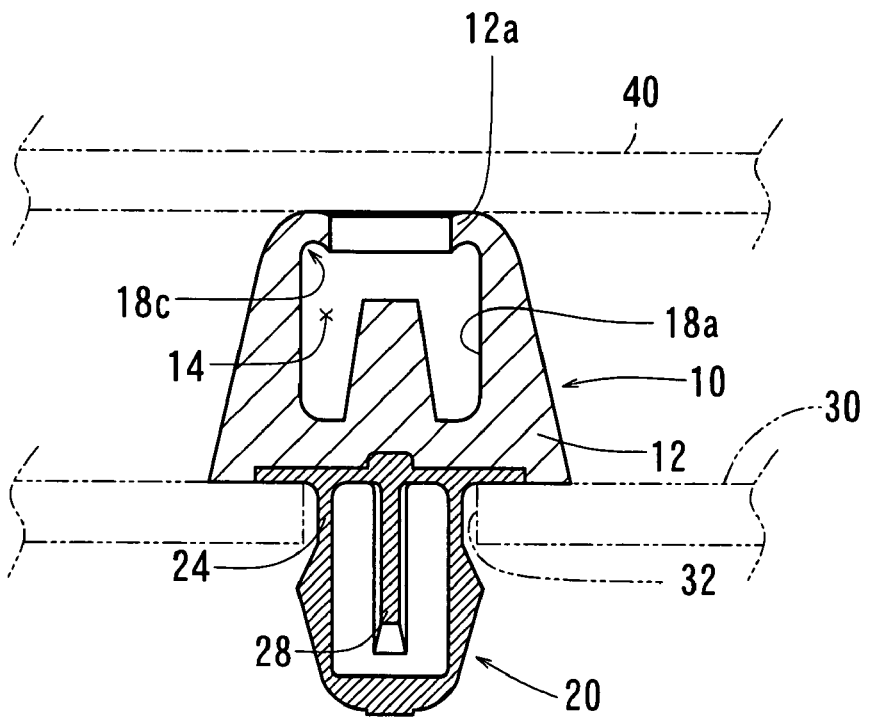
FIG. 6 shows a state in which a cushioning part of the cushioning clip receives a movement of a movable member approaching the stationary member.

FIG. 6 shows a state in which the cushioning part 10 of the cushioning clip 1 receives a movement of the movable member 40 approaching the stationary member 30.

As shown in FIG. 6, when the cushioning part 10 receives the movement of the movable member 40, the apex part 12a on the distal end side of the cushioning part 10 is flexed and wound inward around the flexure part 18c. Such flexural deformation makes it possible to absorb an impact force caused upon receiving the movement of the movable member 40. The main body 12 of the cushioning part 10, except for the apex part 12a, does not easily fall inward or outward because a hollow part 14 is formed within the cushioning part 10 and the inner wall 18a of the hollow part 14 is formed almost perpendicularly to the stationary member 30. This is considered to result from the fact that a load from the movable member 40 is applied in the same direction as the direction in which the inner wall 18a, of the hollow part 14 formed in the cushioning part 10, extends.

Therefore, it is possible to obtain an effect of preventing the main body 12 of the cushioning part 10 from falling inward or outward with a cushioning clip 1 according to this embodiment mode. Additionally, it is possible to obtain an effect of making the cushioning part 10 unlikely to be permanently deformed, even when a long-term load or a load exceeding a certain limit is applied from the movable member 40 to the cushioning part 10.

The cushioning clip 1 according to this embodiment mode can absorb an impact force, which is caused upon receiving the movement of the movable member 40 approaching the stationary member 30, through inward flexural deformation of the apex part 12a of the cushioning part 10. The cushioning clip 1 of this embodiment mode can support a long-term load or a load exceeding a certain limit, which is applied from the movable member 40 to the cushioning part 10, with the entire body thereof except for the apex part 12a of the cushioning part 10. Thus, a cushioning clip 1 can be realized having a cushioning part 10 formed of a flexible material, which is unlikely to be permanently deformed, while exhibiting an impact absorbing capacity equal to or greater than that of the conventional cushioning clip.

Figure 7:
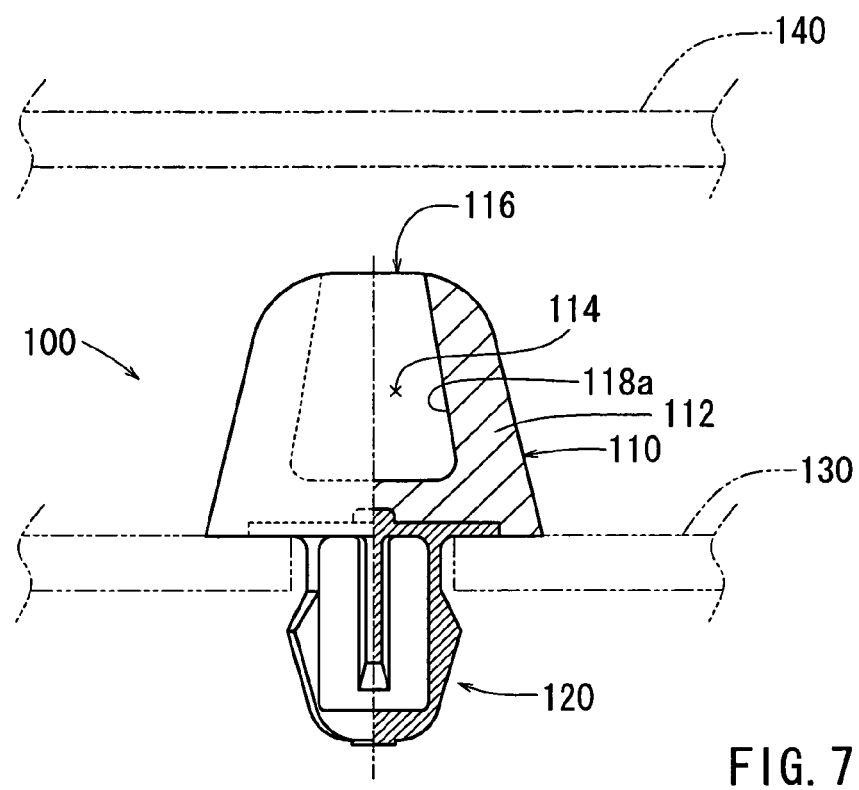
FIG. 7 is a front view showing an example of a conventional cushioning clip.

Now, for the sake of comparison between the cushioning clip 1 of the present invention and a conventional cushioning clip, an example of the conventional cushioning clip is shown in FIG. 7. As shown in FIG. 7, a conventional cushioning clip 100 is broadly divided into a cushioning part 110 formed of a flexible material such as elastomer resin, and a mounting part 120 formed of a rigid material such as polypropylene (PP). A hollow part 114 is formed substantially in a central region of the cushioning part 110. The inner diameter of the hollow part 114 gradually decreases toward an opening part 116 provided on a distal end side. In other words, an inner wall 118a of the hollow part 114 does not extend perpendicularly to a stationary member 130, but is instead inclined inward with respect thereto.

Figure 8:
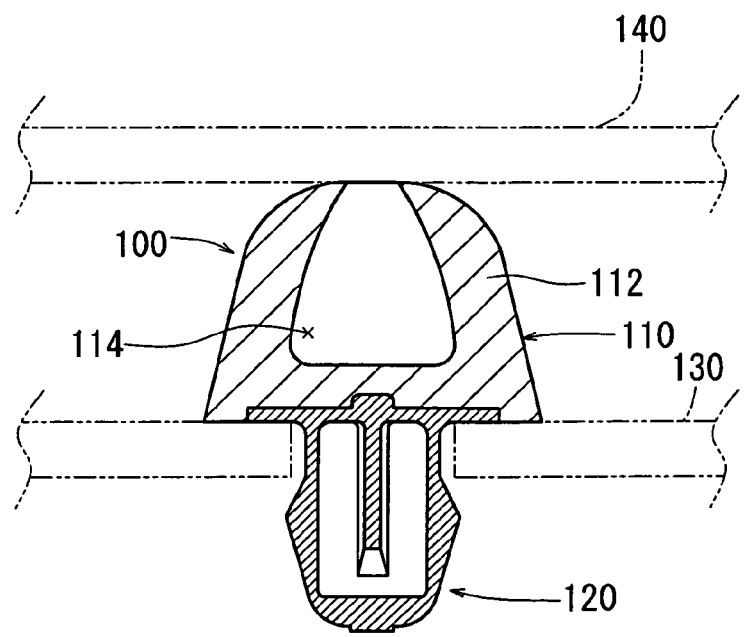
FIG. 8 shows a state in which a cushioning part of the conventional cushioning clip receives the movement of a movable member approaching a stationary member.

FIG. 8 shows a state in which the cushioning part 110 of the cushioning clip 100 receives the movement of a movable member 140 approaching the stationary member 130.

As shown in FIG. 8, when a load from the movable member 140 is applied to the conventional cushioning clip 100, a bending moment causing the main body 112 of the cushioning part 110 to be bent inward is generated because the inner wall 118a of the hollow part 114 is inclined inward. Thus, when a long-term load or a load exceeding a certain limit is applied to the cushioning clip 100, the main body 112 of the cushioning part 110 is bent inward as a whole. This leads to a difficulty in that the cushioning part 110 is permanently deformed and cannot reassume its original shape, even after the load has been removed.

As shown in FIGS. 5 and 6, according to the cushioning clip 1 of this embodiment mode, the cushioning part 10 is provided with the hollow part 14 having the opening part 16 opening toward the distal end side. Formation of such an opening part 16 in the hollow part 14 produces an effect of making the cushioning part 10 unlikely to be deformed by a load from the movable member 40, and an effect of enhancing the capacity to absorb an impact transmitted from the movable member 40. An increase or decrease in the area of the opening part 16 produces an effect of enabling adjustment of cushioning performance in receiving the approaching movable member 40.

In the cushioning clip 1 according to this embodiment mode, the cushioning part 10 is provided with the hollow part 14 in which a projection part 19 projecting from the base end side toward the distal end side is formed. Formation of such a projection part 19 in the hollow part 14 can prevent the main body 12 of the cushioning part 10 from being excessively deformed. A change in the length or shape of the projection part 19 makes it possible to adjust the capacity to absorb an impact caused upon receiving the approaching movable member 40.

The projection part 19 is an auxiliary means for adjusting the impact force absorbing characteristics of the cushioning part 10. It is therefore optional to provide the cushioning clip 1 with the projection part 19.

The cushioning part 10 is formed of a flexible material as described above. The material for the cushioning part 10 can be appropriately selected in consideration of a load applied from the movable member 40, an impact force transmitted therefrom, and the like. For instance, thermoplastic elastomer, butadiene rubber, silicon rubber, or the like, can be selected as the material for the cushioning part 10. In contrast, the mounting part 20 is formed of a rigid material. The material for the mounting part 20 can be appropriately selected in consideration of a crisp feel created by the passage of the engaging claws 26 when inserting the leg part 24 into the mounting hole 32 of the stationary member 30, an engaging force applied to the mounting hole 32, and the like. For instance, polypropylene resin, polyethylene resin, or the like can be selected as the material for the mounting part 20. The statement that the respective materials for the mounting part 20 and the cushioning part 10 are "rigid" and "flexible" represents a relationship in the magnitude of hardness or rigidity between those parts. In other words, the mounting part 20 is formed of a material "more rigid" than the cushioning part 10.

The shapes of the respective parts of the cushioning clip 1 can be changed into other shapes as long as they do not depart from the essence of the present invention. For instance, the shape of the cushioning part 10 can be changed into a shape other than a truncated cone. Also, a clip having a shape other than that of a ship bottom can be adopted as the mounting part 20.

The cushioning clip according to the present invention is also applicable to various opening and closing components other than the glove compartment in a cabin of an automobile. For instance, the cushioning clip according to the present invention is applicable to various opening and closing parts of an automobile, including a side door, a lid for an engine bay, and the like.

Although the first embodiment mode deals with an example in which the stationary member 30 and the movable member 40 respectively correspond to the main body of a glove compartment in a cabin of an automobile and the lid of the glove compartment, the present invention can also be implemented in an opposite mode. In other words, it is also appropriate that the stationary member 30 and the movable member 40 are respectively realized as the lid of the glove compartment and the main body of the glove compartment.

In the present invention, the terms "movable member" and "stationary member" are used to express two members respectively approaching each other. Accordingly, "the movable member" is not necessarily a manually operable one of the two members.

A comparison test was conducted on the shape recovery characteristics of the cushioning part of the cushioning clip after having applied a load thereto for a predetermined period at a predetermined temperature, and then removing the load.

First of all, the cushioning part 110 of the conventional cushioning clip 100 was compressed in its height direction by 4 mm and then fixed in position by means of a jig (the pre-compression height of the cushioning part 110 is 10 mm). The cushioning clip 100 was placed into a thermostatic bath. The thermostatic bath was heated from 23° C. to 85° C. over a period of an hour, maintained at 85° C. for five hours, and then cooled down from 85° C. to 23° C. over a period of an hour. After having repeated this temperature change cycle twice, the cushioning clip 100 was taken out from the thermostatic bath and released from the jig. The height of the cushioning part 110 was then measured. The results of this measurement revealed that the cushioning part 110 had a shape recovery factor of 35%. The term "shape recovery factor" as used herein refers to the shape recovery of a compressed part (4 mm) of the cushioning part 110 in the height direction (i.e., a direction from the base end side toward the distal end side).

Subsequently, the cushioning part 10 of the cushioning clip 1 of the present invention was compressed in its height direction by 4 mm and then fixed by means of the jig (the pre-compression height of the cushioning part 10 is 10 mm). The cushioning clip 1 was placed into the thermostatic bath. The thermostatic bath was heated from 23° C. to 85° C. over a period of an hour, maintained at 85° C. for five hours, and then cooled down from 85° C. to 23° C. over a period of an hour. After having repeated this temperature change cycle twice, the cushioning clip 1 was taken out from the thermostatic bath and released from the jig. The height of the cushioning part 10 was then measured. The results of this measurement revealed that the cushioning part 10 had a shape recovery factor of 66%.

In other words, it has become apparent that the cushioning clip 1 of the present invention is superior in regards to the shape recovery factor of the cushioning part 10 as compared to the shape recovery factor of to the conventional cushioning clip 100, because the cushioning part 10 is unlikely to be deformed even when a load is applied thereto for a long period of time.

Hereinafter, a second embodiment mode of the present invention will be described in detail.

In this embodiment, a cushioning clip is provided for receiving the movement of a movable member approaching a stationary member, at a position close to an end of the cushioning clip. The cushioning clip includes a cushioning part for absorbing an impact force and an engaging part coupled to the stationary member in which the cushioning part has a hollow part formed therein.

In the cushioning clip of this embodiment the hollow part can be formed so as to extend through in a direction perpendicular to an axis connecting an impact force receiving part of the cushioning part to the engaging part substantially in a region close to a center of the cushioning part.

Furthermore, in the cushioning clip of this embodiment the hollow part may include a projection part extending along the axis. In the cushioning clip of the second embodiment the hollow part can be formed along an axis connecting an impact force receiving part of the cushioning part to the engaging part substantially in a region close to a center of the cushioning part and opens at the impact force receiving part of the cushioning part.

Still further, in the cushioning clip of the second embodiment the cushioning part may include a fragile part in its impact force receiving part that is more likely to bend than the other parts.

According to another aspect of the second embodiment, a cushioning clip is provided for receiving a movement of a movable member approaching a stationary member at a position close to an end of the cushioning clip. The cushioning clip consists of a cushioning part for absorbing an impact force and an engaging part coupled to the stationary member. The cushioning part is formed of a flexible material and the engaging part is formed of a rigid material. The cushioning part covers a base plate part of the engaging part and the base plate part comprises therein a core projecting into the cushioning part.

Figure 9:
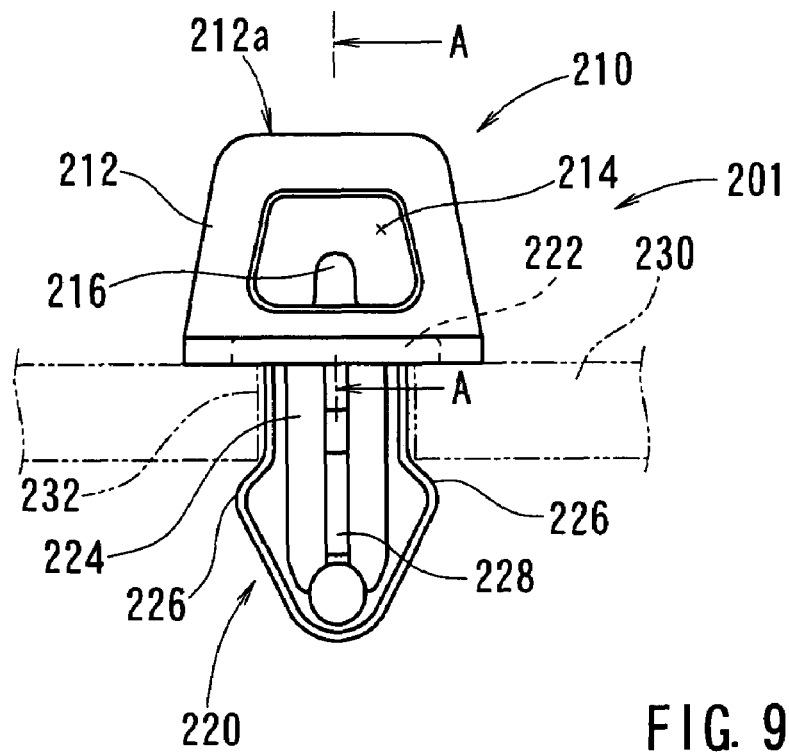
FIG. 9 is a front view illustrating a cushioning clip according to a second embodiment mode of the present invention.
Figure 10:
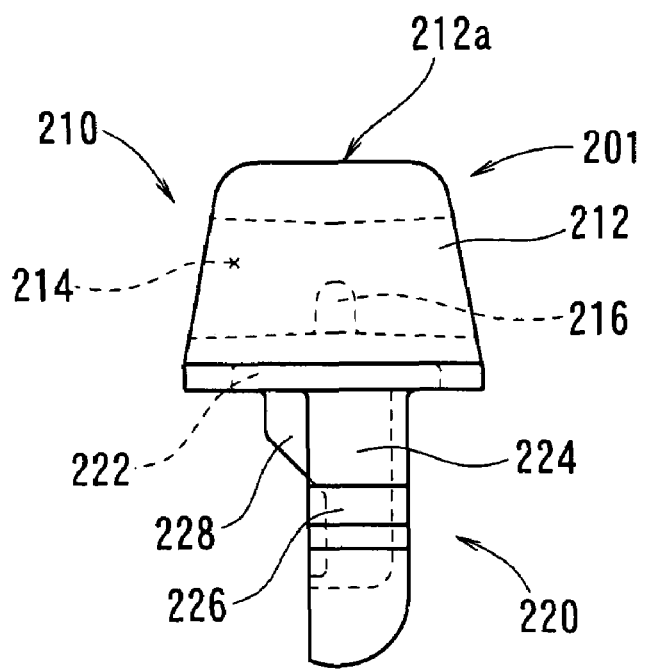
FIG. 10 is a side view illustrating the cushioning clip of the second embodiment mode.
Figure 11:
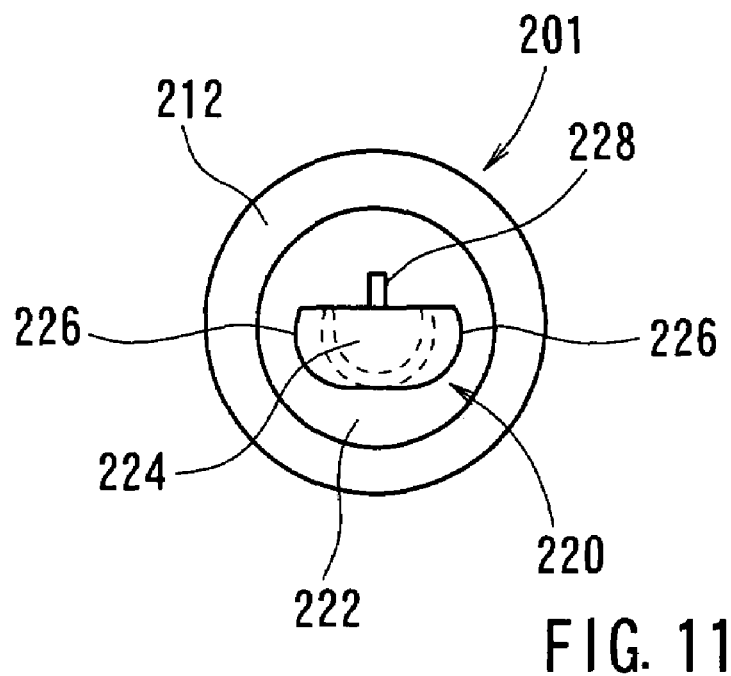
FIG. 11 is a bottom view illustrating the cushioning clip of the second embodiment mode.
Figure 12:
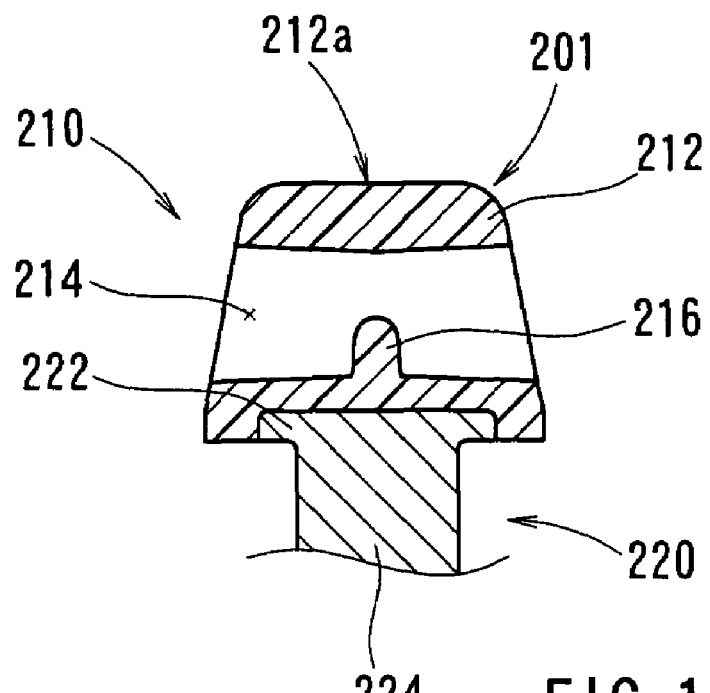
FIG. 12 is a sectional view of the cushioning clip taken along a direction indicated by arrows A of FIG. 9.

Turning now to FIG. 9 which is a front view illustrating a cushioning clip according to the second embodiment mode of the present invention. FIG. 10 is a side view illustrating the cushioning clip of the second embodiment mode. FIG. 11 is a bottom view illustrating the cushioning clip of the second embodiment mode. FIG. 12 is a sectional view of the cushioning clip taken along a direction indicated by arrows A of FIG. 9. The cushioning clip 201 shown in these figures is intended to absorb an impact force caused upon the opening and closing of an ashtray for an automobile. The cushioning clip 201 is broadly divided into a cushioning part 210, formed of a flexible material such as elastomer resin, and an engaging part 220, formed of a rigid material such as polypropylene (PP).

The cushioning part 210 substantially assumes the shape of a truncated cone as a whole and receives an impact force on a top face 212a on a small-diameter side of the main body 212 thereof. A root part, located on a large-diameter side on the other side of the top face 212a, covers a base plate part 222 of the engaging part 220 (see FIG. 12), so that the cushioning part 210 and the engaging part 220 are integrated with each other. A hollow part 214, which extends through in a direction perpendicular to an axis connecting the top face 212a to the engaging part 220, is provided substantially in the vicinity of the center of the main body 212 of the cushioning part 210. In other words, the hollow part 214 opens at two lateral parts of the main body 212. A projection part 216 is provided inside the hollow part 214, projecting upward on the axis from a bottom face.

The engaging part 220 is provided with a leg part 224 extending downward from the base plate part 222. The leg part 224 is inserted into a mounting hole 232 of a stationary member 230 indicated by the virtual lines of FIG. 9. The leg part 224 assumes the shape of a ship bottom as a whole. Flexible wall parts on both sides respectively form engaging claws 266. A reinforcing rib 228 is formed on a central portion of the leg part 224. By inserting the leg part 224 into the mounting hole 232 from one side of the stationary member 230, both of the engaging claws 226 pass through the mounting hole 232 in a state where the engaging claws 226 are deflected and then reach the other side of the stationary member 230 (see FIG. 9). As a result, the engaging part 220 is coupled to the stationary member 230 such that the cushioning clip 201 is mounted to the stationary member 230.

In this embodiment mode, the stationary member 230 is located at a position where an ashtray (movable member) of the automobile is fitted. However, the stationary member 230 may be a door when the movable member is realized in the form of a door. In any case, the cushioning clip 201 is located so as to receive a movement of the movable member approaching the stationary member 230 at a position close to an end of the movable member.

The cushioning clip 201 of this embodiment mode is mounted to the stationary member 230 shown in FIG. 9 by inserting the engaging part 220 into the mounting hole 232 of the stationary member 230. Since the cushioning clip 201 is mounted to the stationary member 230, the cushioning part 210 receives the movement of the movable member at a position close to an end thereof. More specifically, the top face 212a of the main body 212 of the cushioning part 210 receives the movable member, and the impact force is absorbed through elastic deformation of the main body 212.

The level of absorption of this impact force can be adjusted by changing the size of the hollow part 214 in the main body 212. Therefore, the cushioning force can be adjusted to some extent even when the main body 212 is made of an inexpensive material instead of an expensive material. Changing the size, the outer shape, or the material of the main body 212 can further increase the range of adjustment. The projection part 216, provided inside of the hollow part 214, can prevent the main body 212 from being excessively deformed. In addition, the cushioning force can also be adjusted by changing the length or shape of the projection part 216. Since the projection part 216 merely serves as an auxiliary means for adjusting the impact force absorbing characteristics of the cushioning part 210, it is dispensable.

The flexible material for the cushioning part 210 can be selected exclusively in favor of impact force absorbing characteristics. In contrast, the rigid material for the engaging part 220 is selected in favor of an intermediate level of feeling between the passage of the engaging claws 226 as the leg part 224 is inserted into the mounting hole 232 of the stationary member 230 and the bonding force applied to the mounting hole 232.

A third embodiment mode of the present invention will be described hereinafter.

Figure 13:
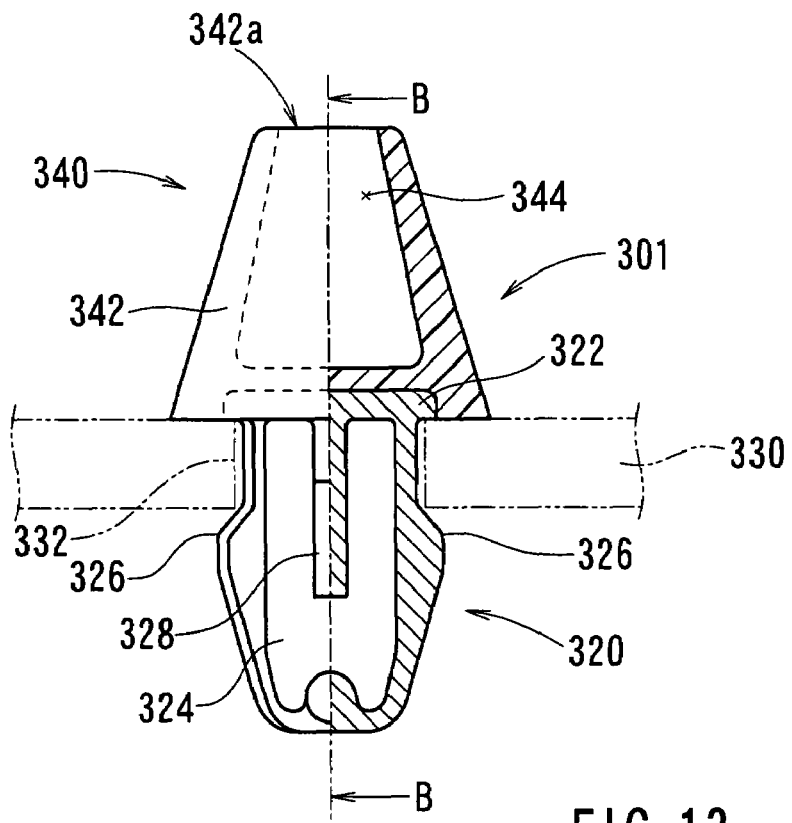
FIG. 13 is a front view, partially in section, of a cushioning clip according to a third embodiment mode of the present invention.
Figure 14:
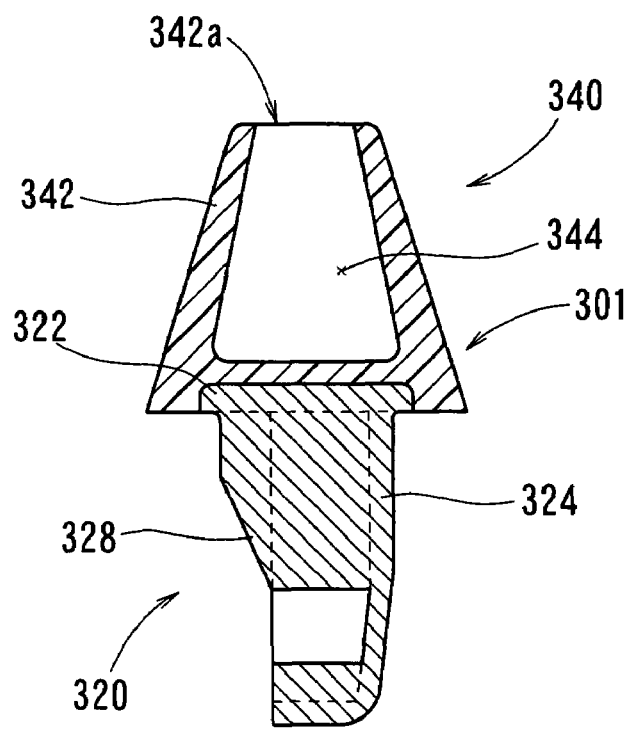
FIG. 14 is a sectional view of the cushioning clip taken along a direction indicated by arrows B of FIG. 13.

FIG. 13 is a front view, partially in section, of a cushioning clip of the third embodiment mode. FIG. 14 is a sectional view of the cushioning clip taken along a direction indicated by arrows B in FIG. 13. The cushioning clip 301 shown in these figures is intended to absorb an impact force caused upon the opening and closing of a glove compartment in a cabin of an automobile. The cushioning clip 301 is broadly divided into a cushioning part 340, formed of a flexible material such as elastomer resin, and an engaging part 320, formed of a rigid material such as polypropylene (PP). Apart from minor differences in the location of engaging claws 326 on the leg part 324 and the shape of a rib 328, the engaging part 320 is structurally identical with that of the second embodiment mode.

The cushioning part 340 assumes the shape of a truncated cone as a whole and receives an impact force on a small-diameter top face 342a of a main body 342 thereof. A large-diameter root part, located on the side opposite of the top face 342a, envelopes a base plate part 322 of the engaging part 320 such that the cushioning part 340 and the engaging part 320 are integrated with each other. A truncated-cone shaped hollow part 344 is provided inside of the main body 342 of the cushioning part 340 and opens at the top face 342a of the main body 342.

The cushioning clip 301 of the third embodiment mode is also mounted to a stationary member 330, shown in FIG. 13, by inserting the engaging part 320 into a mounting hole 332 of the stationary member 330. The cushioning part 340 receives the movement of a movable member (e.g., a lid of the glove compartment) at a position close to an end of thereof. In other words, the top face 342a of the main body 342 receives the movable member such that an impact force is absorbed through the elastic deformation of the main body 342. The hollow part 344 opens at the top face 342a of the main body 342 for receiving the impact force. The cushioning force exerted in receiving the movable member can be finely adjusted by changing the shape of the hollow part 344.

A fourth embodiment mode of the present invention will be described hereinafter.

Figure 15:
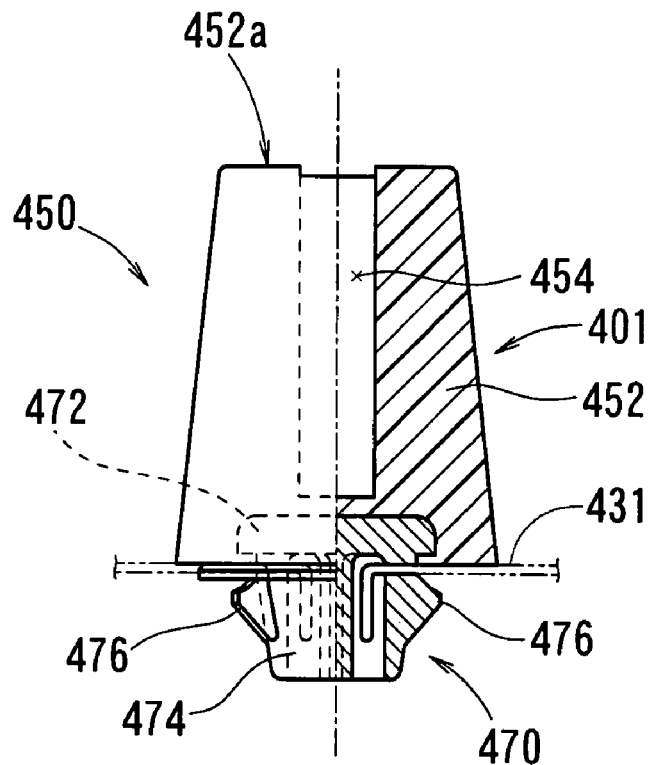
FIG. 15 is a front view, partially in section, of a cushioning clip according to a fourth embodiment mode of the present invention.
Figure 16:
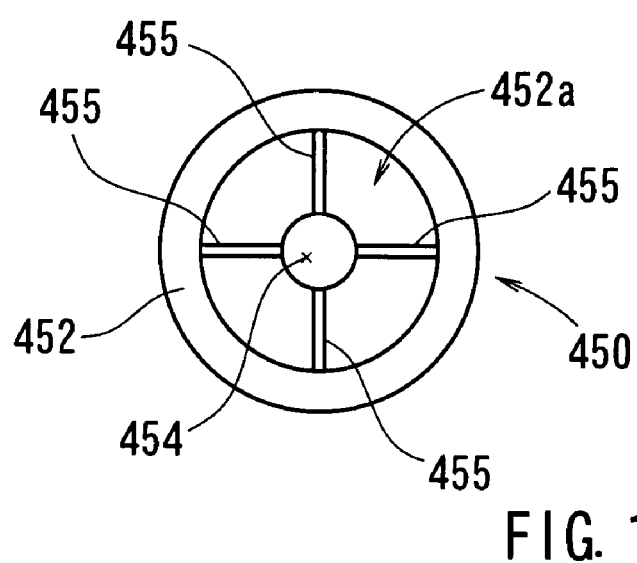
FIG. 16 is a plan view of the cushioning clip of the fourth embodiment mode.

FIG. 15 is a front view, partially in section, of a cushioning clip of the fourth embodiment mode. FIG. 16 is a plan view of the cushioning clip of the fourth embodiment mode. The cushioning clip 401 shown in these figures is intended to absorb a relatively large impact force caused upon the opening and closing of a backdoor for an automobile. The cushioning clip 401 is broadly divided into a cushioning part 450, formed of a flexible material such as elastomer resin, and an engaging part 470, formed of a rigid material such as polypropylene (PP).

The cushioning part 450 assumes the shape of a truncated cone as a whole and receives an impact force on a small-diameter top face 452a of a main body 452 thereof. A large-diameter root part, located on the other side of the top face 452a, envelopes a base plate part 472 of the engaging part 470 such that the cushioning part 450 and the engaging part 470 are integrated with each other. A cylindrical hollow part 454 is provided inside of the main body 452 of the cushioning part 450, and opens at the top face 452a of the main body 452. A plurality of (four) grooves 455, which extend from an outer periphery of the top face 452a to an opening of the hollow part 454, are formed in the top face 452a of the main body 452.

The engaging part 470 is provided with a leg part 474 extending downward from the base plate part 472. The leg part 474 is inserted into a mounting hole of a stationary member 431 (body panel) indicated by virtual lines in FIG. 15. Flexible engaging claws 476 are respectively formed on two sides of the leg part 474. By inserting the leg part 474 into the mounting hole from one side of the stationary member 431, both of the engaging claws 476 pass through the mounting hole in a flexed state and then reach the other side of the stationary member 431. Thus, the engaging part 470 is coupled to the stationary member 431 such that the cushioning clip 401 is mounted to the stationary member 431.

The cushioning clip 401 is mounted to the stationary member 431 shown in FIG. 15 by inserting the engaging part 470 into the mounting hole of the stationary member 431. The cushioning part 450 receives the closing movement of a movable member (e.g., such as a backdoor for an automobile) at a position close to an end thereof. In other words, the top face 452a of the main body 452 receives the movable member such that an impact force is absorbed through the elastic deformation of the main body 452. Since a plurality of grooves 455 are formed in the top face 452a of the cushioning part 450, to which the impact force is first received, the initial impact load is received in a cushioned manner. After that, cushioning characteristics are obtained based on the shape of the hollow part 454.

A fifth embodiment mode of the present invention will be described hereinafter.

Figure 17:
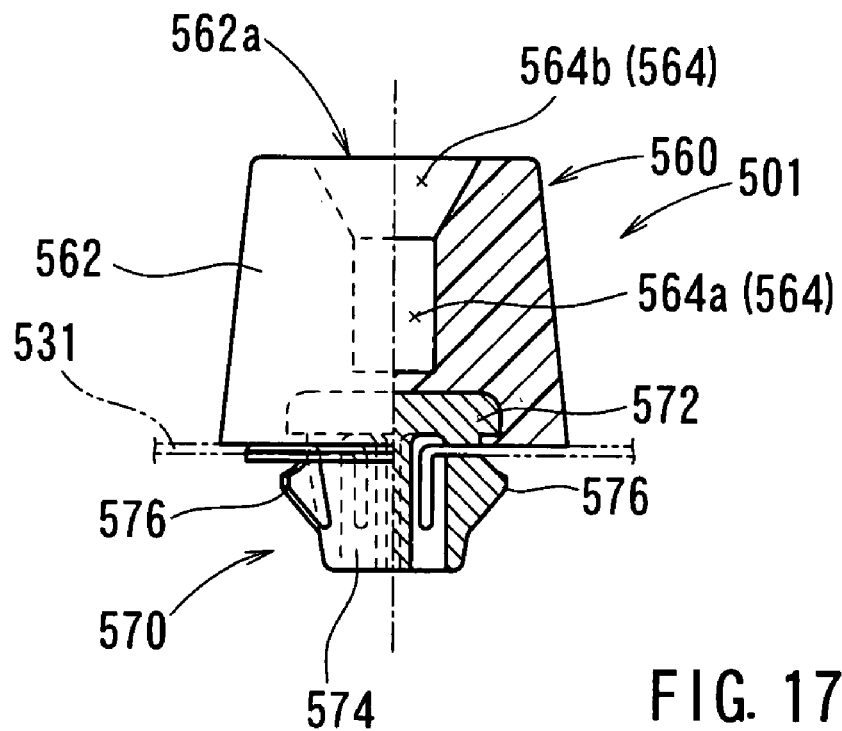
FIG. 17 is a front view, partially in section, of a cushioning clip according to a fifth embodiment mode of the present invention.
Figure 18:
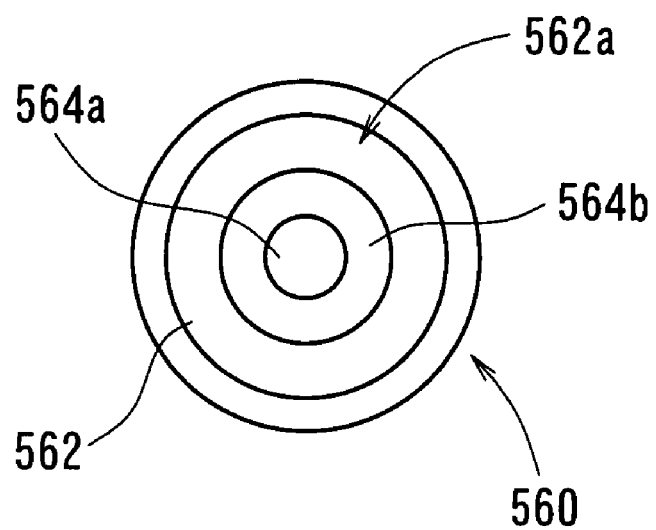
FIG. 18 is a plan view of the cushioning clip of the fifth embodiment mode.

FIG. 17 is a front view, partially in section, of a cushioning clip of the fifth embodiment mode. FIG. 18 is a plan view of the cushioning clip of the fifth embodiment mode. The cushioning clip 501 shown in these figures is intended to absorb a relatively large impact force, as is the case with the cushioning clip of the fourth embodiment mode. The cushioning clip 501 is provided with a cushioning part 560 formed of a flexible material such as elastomer resin, and an engaging part 570 constructed in the same manner as in the fourth embodiment mode.

The cushioning part 560 assumes the shape of a truncated cone as a whole and receives an impact force on a small-diameter top face 562a of a main body 562 thereof. A large-diameter root part located on the other side of the top face 562a envelopes a base plate part 572 of the engaging part 570, so the cushioning part 560 and the engaging part 570 are integrated with each other. A hollow part 564, opening at the top face 562a, is provided inside of the main body 562 of the cushioning part 560. The hollow part 564 is composed of a cylindrical straight part 564a and a conical part 564b opening toward the top face 562a on the opening side. The cushioning clip 501 of the fifth embodiment mode exhibits almost the same impact force absorbing characteristics as with the cushioning clip 401 of the fourth embodiment mode.

A sixth embodiment mode of the present invention will be described hereinafter.

Figure 19:
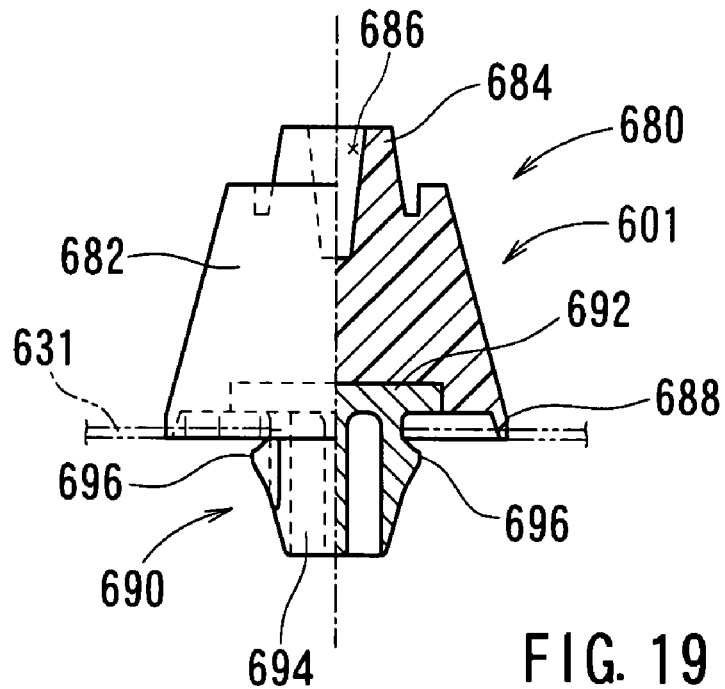
FIG. 19 is a front view, partially in section, of a cushioning clip according to a sixth embodiment mode of the present invention.
Figure 20:
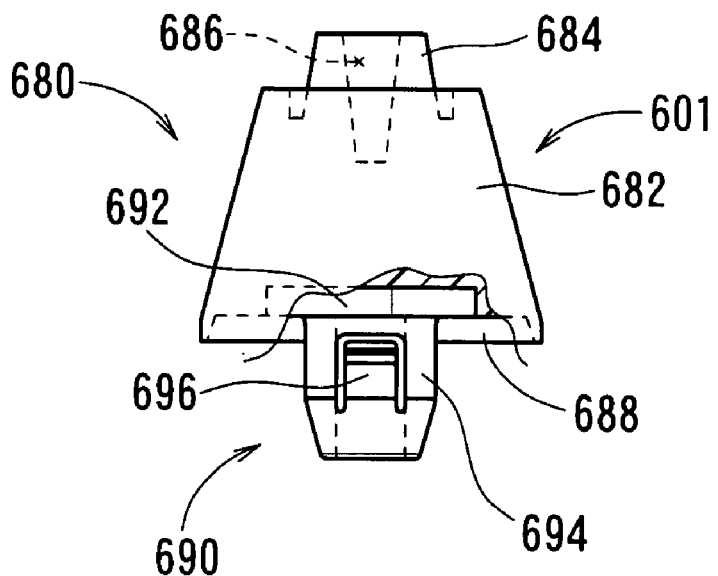
FIG. 20 is a side view of the cushioning clip of the sixth embodiment mode.

FIG. 19 is a front view, partially in section, of a cushioning clip of the sixth embodiment mode. FIG. 20 is a side view of the cushioning clip of the sixth embodiment mode. A cushioning clip 601 of the sixth embodiment mode is broadly divided into a cushioning part 680, formed of a flexible material such as elastomer resin, and an engaging part 690, formed of a rigid material such as polypropylene (PP). A fragile part 684 is formed integrally with a main body 682 of the cushioning part 680 on a small-diameter side thereof. The main body 682 and the fragile part 684 each assume the shape of a truncated cone. Formed in a central part of the fragile part 684 is a hole 686 opening on a front-end face thereof. However, the main body 682 is not provided with any part corresponding to the hollow parts in the foregoing respective embodiment modes.

In the main body 682 of the cushioning part 680, a large-diameter root part, located on the other side of the fragile part 684, envelopes a base plate part 692 of the engaging part 690 such that the cushioning part 680 and the engaging part 690 are integrated with each other. A lip part 688 is circumferentially continuously formed along an outer periphery of the large-diameter root part of the main body 682. The engaging part 690 is also provided with a leg part 694 extending downward from the base plate part 692. The leg part 694 is inserted into a mounting hole of a stationary member 631 (e.g., body panel) indicated by virtual lines in FIG. 19. Flexible engaging claws 696 are respectively formed on two sides of the leg part 694.

Also in the cushioning clip 601 of the sixth embodiment mode, by inserting the engaging part 690 into the mounting hole of the stationary member 631 both of the engaging claws 696 pass through the mounting hole in their flexed states and then reach the other side of the stationary member 631. As a result, the cushioning clip 601 is mounted to the stationary member 631. At this moment, the lip part 688 is pressed against a surface of the stationary member 631 so as to be elastically deformed, thus enhancing the degree of adhesion of the main body 682 to the stationary member 631.

While the cushioning part 680 receives the movement of a movable member at a position close to an end thereof, the initial impact load is absorbed through elastic deformation of the fragile part 684 and then a predetermined impact force is absorbed through the elastic deformation of the main body 682. Therefore, the cushioning part 680 exhibits two-stage impact force absorbing characteristics; so one type of cushioning clip can be used for different locations having different flexure amounts.

A seventh embodiment mode of the present invention will be described hereinafter.

Figure 21:
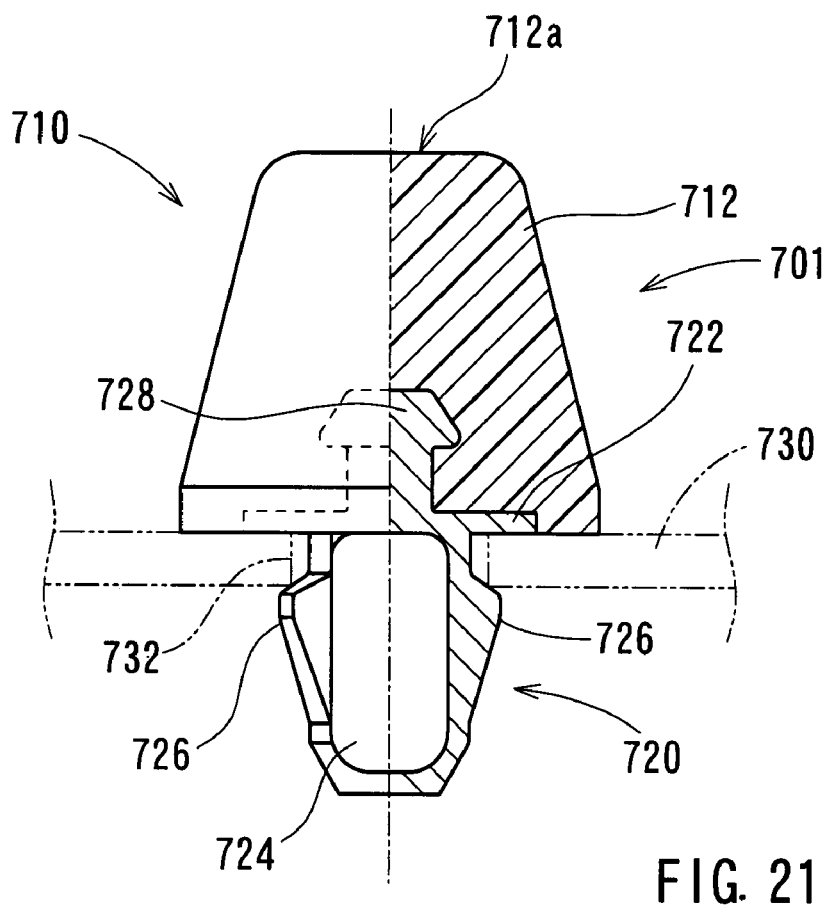
FIG. 21 is a front view, partially in section, of a cushioning clip according to a seventh embodiment mode of the present invention.
Figure 22:
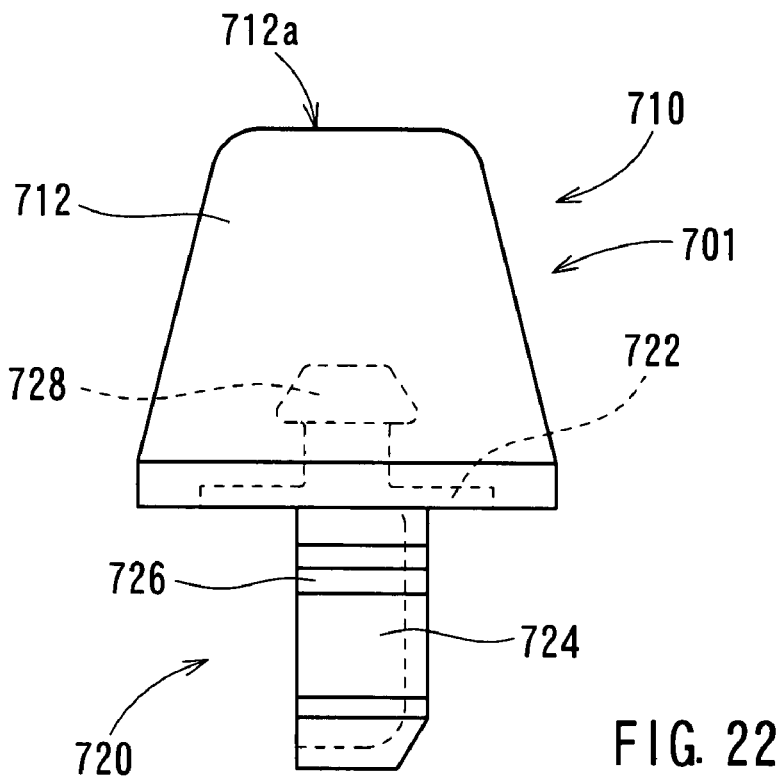
FIG. 22 is a side view of the cushioning clip of the seventh embodiment mode.

FIG. 21 is a front view, partially in section, of a cushioning clip of the seventh embodiment mode. FIG. 22 is a side view of the cushioning clip of the seventh embodiment mode. The structure of a cushioning clip 701 of the seventh embodiment mode is broadly divided into a cushioning part 710, formed of a flexible material such as elastomer resin, and an engaging part 720, formed of a rigid material such as polypropylene (PP).

The cushioning part 710 assumes the shape of a truncated cone and receives an impact force on a small-diameter top face 712a of a main body 712 thereof. A large-diameter root part located on the side opposite to the top face 712a envelopes a base plate part 722 of the engaging part 720 such that the cushioning part 710 and the engaging part 720 are integrated with each other. As in the case with the sixth embodiment, the main body 712 of the cushioning part 710 is not provided with any hollow part.

The engaging part 720 is provided with a leg part 724 extending downward from the base plate part 722. The leg part 724 is inserted into a mounting hole 732 of a stationary member 730 (e.g., a board for a vehicle interior) indicated by virtual lines in FIG. 21. The leg part 724 is structurally similar to the leg part 224 of the second embodiment mode. That is, flexible wall parts on two sides respectively form engaging claws 726. By inserting the leg part 724 into the mounting hole 732 of the stationary member 730, both of the engaging claws 726 extend through to the other side of the stationary member 730. Therefore, the cushioning clip 701 is mounted to the stationary member 730. The base plate part 722 is provided with a core 728 projecting into the main body 712 in an axial center region of the cushioning clip 701.

Also, the cushioning clip 701 of the seventh embodiment mode is mounted to the stationary member 730 by inserting the engaging part 720 into the mounting hole 732 of the stationary member 730. The top face 712a of the main body 712 receives a movement of the movable member at a position close to an end thereof. At this point, an impact force is absorbed through elastic deformation of the main body 712. The impact force absorbing characteristics can be adjusted by selecting the projection amount, the shape, or the position of the core 728. The cushioning clip 701 of the seventh embodiment mode is suited for a case where the cushioning part 710 is required to exhibit certain levels of rigidity.

Although the preferred embodiment modes of the present invention have been described with reference to the drawings, the preferred embodiment modes can be easily altered or modified without departing from the subject matter of the present invention. In the respective embodiment modes, for instance, the materials for the cushioning part and the engaging part are not limited to the above-mentioned resin materials but may be selected according to their respective functions.

The invention claimed is:

1. A cushioning clip for receiving a movement of a movable member approaching a stationary member, the cushioning clip comprising:

a cushioning part adapted for absorbing an impact force and formed of a flexible material exhibiting elasticity, the cushioning part extending between distal and proximal ends thereof and provided with a hollow interior part, the hollow interior part is defined by an inner wall extending substantially normally to the stationary member and an apex part extending transversely to the inner wall, a projection part projecting within the hollow interior part from the proximal end toward the distal end, an opening provided within the apex part, the apex part is inwardly flexed via a flexure part disposed at a junction thereof with the inner wall; and a mounting part for mounting the cushioning part to the stationary member, the mounting part is positioned at the proximal end of the cushioning part and exhibiting a rigidity greater than the rigidity of the cushioning part;

whereby the impact force caused upon receiving the movement of the movable member approaching the stationary member is absorbed through inward flexural deformation of the apex part including the flexure part.

2. The cushioning clip according to claim 1, wherein said projection part prevents the cushioning part from being excessively deformed and functions as means for adjusting impact force absorbing characteristics of the cushioning part.

3. The cushioning clip according to claim 2, wherein said impact force absorbing characteristics are adjusted by changing the lengths or shape of the projection part.

4. A cushioning clip according to claim 1, wherein the opening is formed within a central area of the apex part, and the impact force is absorbed through the inward flexural deformation of the apex part adjacent the opening and the flexure part.

5. A cushioning clip according to claim 1, wherein the hollow interior part is formed having substantially cylindrical configuration.

6. A cushioning clip for receiving a movement of a movable member approaching a stationary member, the cushioning clip comprising:

a cushioning part adapted for absorbing an impact force and formed of a flexible material exhibiting elasticity, the cushioning part extending between distal and proximal ends thereof and provided with a hollow interior part, the hollow interior part is defined by an inner wall extending substantially normally to the stationary member and an apex part extending transversely to the inner wall, the hollow interior part formed having substantially cylindrical configuration; an opening provided within the apex part, the apex part is inwardly flexed via a flexure part disposed at a junction thereof with the inner wall; and a mounting part for mounting the cushioning part to the stationary member, the mounting part is positioned at the proximal end of the cushioning part and exhibiting a rigidity greater than the rigidity of the cushioning part;

whereby the impact force caused upon receiving the movement of the movable member approaching the stationary member is absorbed through inward flexural deformation of the apex part including the flexure part.

7. Cushioning clip according to claim 6, wherein the hollow interior part is provided with a projection part projecting within the hollow interior part from a base end side toward the distal end.

8. The cushioning clip according to claim 7, wherein said projection part prevents the cushioning part from being excessively deformed and functions as means for adjusting impact force absorbing characteristics of the cushioning part.

9. The cushioning clip according to claim 8, wherein said impact force absorbing characteristics are adjusted by changing the lengths or shape of the projection part.

10. The cushioning clip according to claim 6, wherein said hollow interior part is unobstructed.

* * * * *